United States Patent
Gopalarathnam et al.

(10) Patent No.: US 10,715,389 B2
(45) Date of Patent: Jul. 14, 2020

(54) AUTOMATIC CONTROLLER CONFIGURATION SYSTEM

(71) Applicant: Dell Products L.P., Round Rock, TX (US)

(72) Inventors: Sudharsan Dhamal Gopalarathnam, Tamil Nadu (IN); Vamshidhar Varre, Telengana (IN)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 16/116,472

(22) Filed: Aug. 29, 2018

(65) Prior Publication Data

US 2020/0076693 A1  Mar. 5, 2020

(51) Int. Cl.
*G06F 13/42* (2006.01)
*H04L 12/24* (2006.01)

(52) U.S. Cl.
CPC ...... *H04L 41/0886* (2013.01); *H04L 41/0806* (2013.01); *H04L 41/0889* (2013.01)

(58) Field of Classification Search
None
See application file for complete search history.

(56) References Cited

U.S. PATENT DOCUMENTS

| 9,531,594 | B2 | 12/2016 | Venkatesan et al. | |
|---|---|---|---|---|
| 2012/0135724 | A1* | 5/2012 | Lewis | H04W 92/20 455/422.1 |
| 2015/0256400 | A1* | 9/2015 | Venkatesan | H04L 41/0886 370/255 |
| 2016/0100234 | A1* | 4/2016 | Adhikesavalu | H04Q 11/0003 398/45 |
| 2016/0267041 | A1* | 9/2016 | Jose | G06F 13/4221 |
| 2018/0321705 | A1* | 11/2018 | Koshisaka | G06F 1/12 |
| 2019/0287063 | A1* | 9/2019 | Skaaksrud | B25J 9/162 |
| 2019/0310619 | A1* | 10/2019 | Clemens | G06F 13/4072 |

* cited by examiner

*Primary Examiner* — Brandon M Renner
(74) *Attorney, Agent, or Firm* — Haynes and Boone, LLP (57) ABSTRACT

An automatic controller configuration system includes a chassis having a port. A transceiver connected to the port utilizes a number of lanes. A controller in the chassis is coupled to the port. The number of lanes utilized by the transceiver are identified, and the controller is configured to operate at a first speed utilizing the number of lanes. In response to detecting a signal transmitted by the transceiver and determining that a link provided via the transceiver has not been established with the controller operating at the first speed, the controller is reconfigured to operate at a second speed. In response to detecting the signal transmitted by the transceiver and determining that the link provided via the transceiver has been established with the controller operating at the second speed, the controller provides for communications with at least one device via the transceiver and at the second speed.

20 Claims, 3 Drawing Sheets

AUTOMATIC CONTROLLER CONFIGURATION SYSTEM

BACKGROUND

The present disclosure relates generally to information handling systems, and more particularly to automatically configuring a controller in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, switch devices, utilize a controller coupled to a port to control high speed communications between the switch device/port and a connected device (e.g., a server device, a storage device, etc.) that is coupled to the switch device via a transceiver that is connected to the port. For example, conventional Time Division Multiplexing (TDM) Serializer/Deserializer (SerDes) controllers such as the FALCON CORE® controller available from BROADCOM® Inc. of San Jose, Calif. United States, may be manually configured (e.g., via a manual change of the controller clock speed using a Command Line Interface (CLI)) to operate in a variety of modes that control high speed communications with server devices or storage devices via an optical transceiver. In a specific example, conventional FALCON CORE controllers utilized in 100G switch device platforms may be manually configured to operate in a 100G mode that provides high speed communications via four lanes to a single port, in a 40G mode that provides high speed communications via four lanes to a single port, in a 2×50G mode that provides high speed communications via two lanes to each of a pair of ports, in a 4×25G mode that provides high speed communications via one lane to each of four ports, and in a 4×10G mode that provides high speed communications via one lane to each of four ports. However, in some situations, the mode of the controller may not match the configuration of the transceiver that is connected to the port and that couples the connected device to the switch device, and even if the mode of the controller and the configuration of the transceiver utilize the same number of lanes (e.g., one lane per port or four lanes per port in the examples above), a manual configuration of the controller is required to enable the establishment of a link between the controller and the transceiver if the controller and the transceiver are configured to operate at different speeds (e.g., 25G or 10G in the examples above), as conventional auto-negotiation techniques will not operate correctly without the establishment of a link. The need for manual configuration of the controller in such situations is a time-consuming process.

Accordingly, it would be desirable to provide an improved controller configuration system.

SUMMARY

According to one embodiment, an Information Handling System (IHS) includes a port; and a controller system that is coupled to the port, wherein the controller system is configured to: identify, when a transceiver is connected to the port, a number of lanes that the transceiver is configured to utilize; configure the controller system to operate at a first speed utilizing the number of lanes; reconfigure, in response to detecting a signal transmitted by the transceiver and determining that a link provided via the transceiver has not been established with the controller system operating at the first speed utilizing the number of lanes, the controller system to operate at a second speed utilizing the number of lanes; and provide, in response to detecting the signal transmitted by the transceiver and determining that the link provided via the transceiver has been established with the controller system operating at the second speed utilizing the number of lanes, communication with at least one device via the transceiver and at the second speed utilizing the number of lanes.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
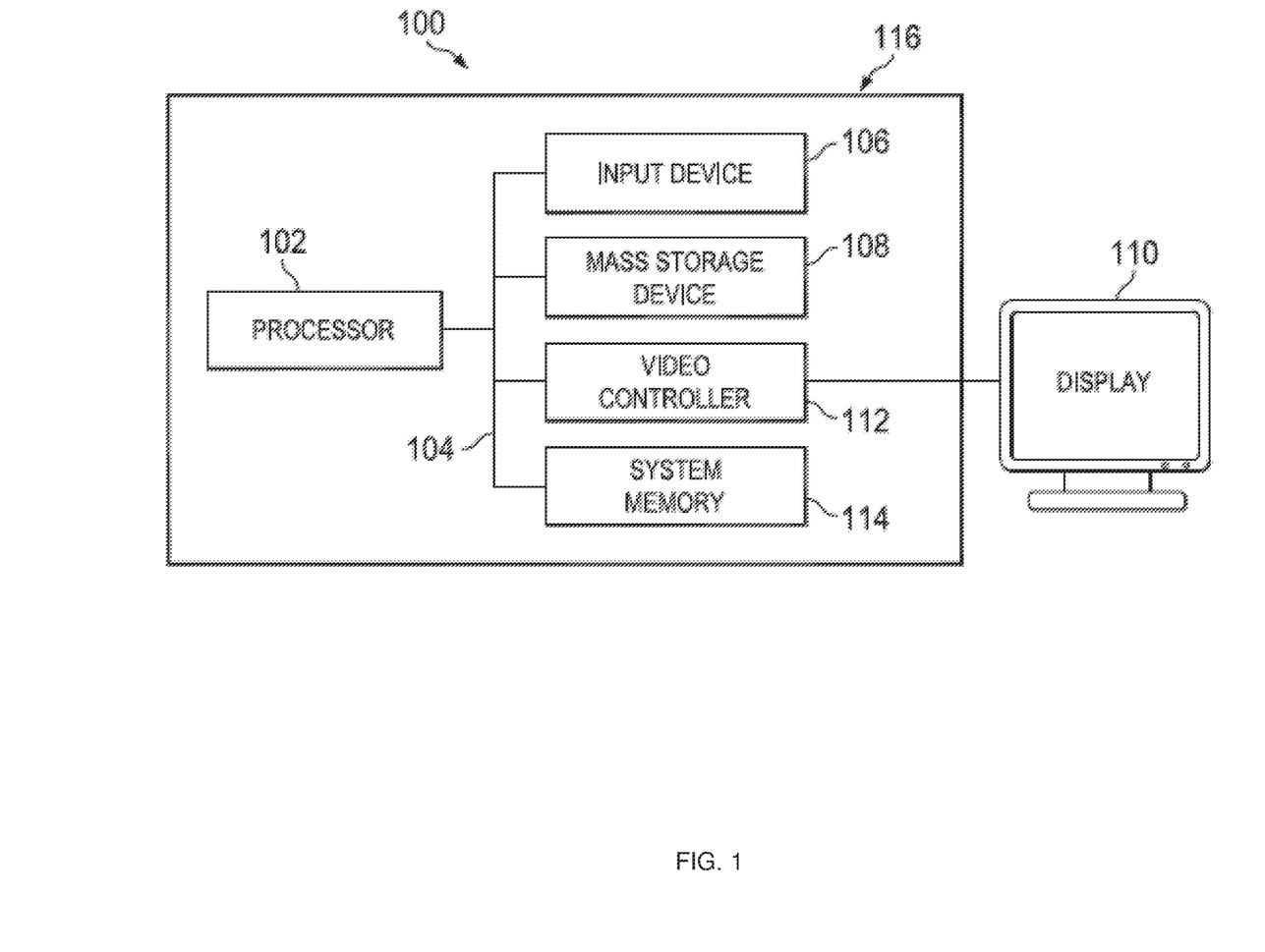
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
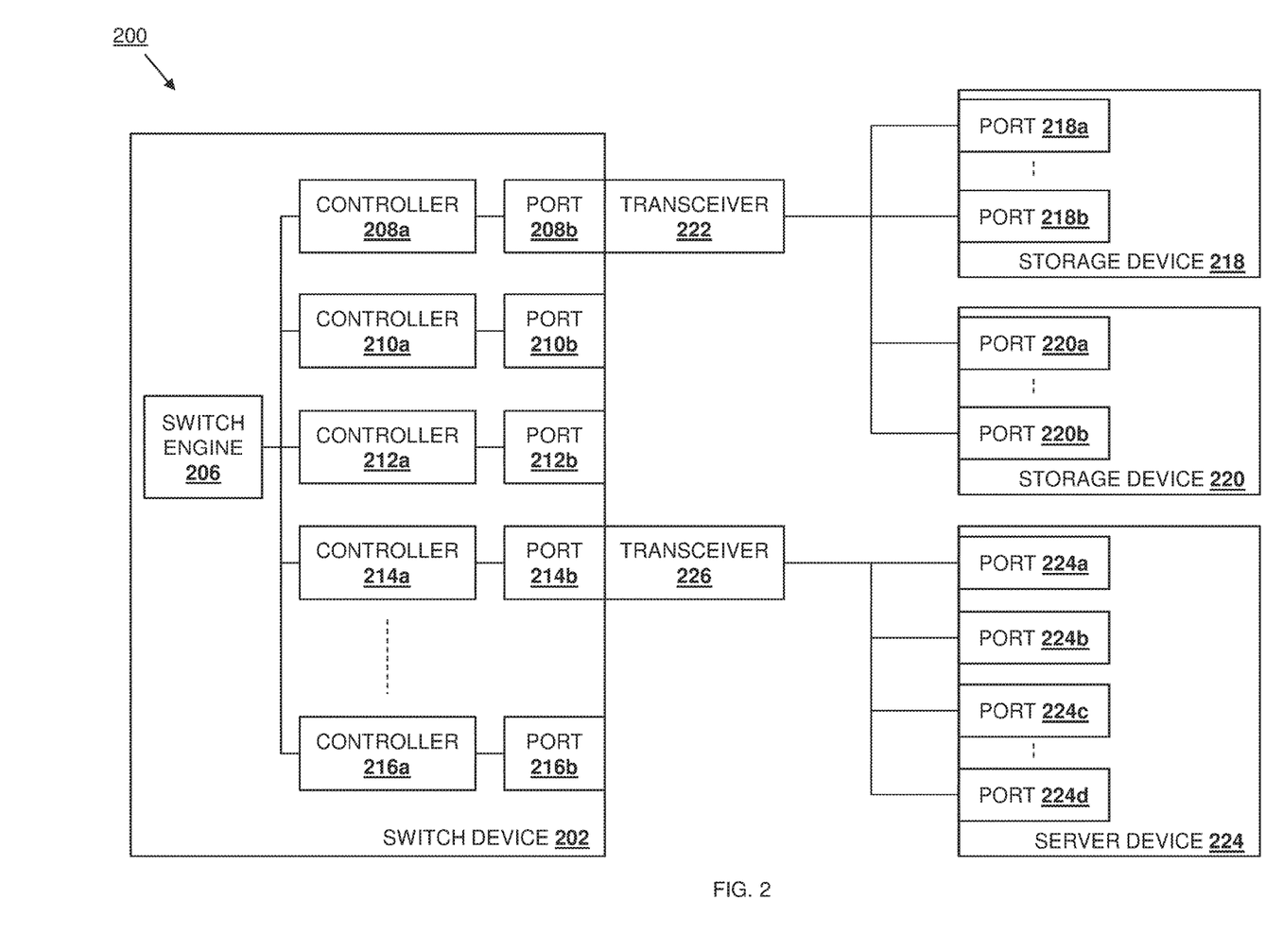
FIG. 2 is a schematic view illustrating an embodiment of an automatic controller configuration system.

Referring now to FIG. 2, an embodiment of an automatic controller configuration system 200 is illustrated. In the illustrated embodiment, the automatic controller configuration system 200 includes a switch device 202. The switch device 200 may be provided by the IHS 100 discussed above with reference to FIG. 1, and/or may include some or all of the components of the IHS 100. In the specific examples discussed below, the switch device 200 is described as a high speed 100G switch device, although as discussed below the switch device 200 may be provided by future high speed networking devices (e.g., 200G networking devices, 400G networking devices, etc.) while remaining within the scope of the present disclosure as well. As illustrated, the switch device 200 may include a chassis 204 that houses the components of the switch device 200, only some of which are illustrated in FIG. 2. For example, the chassis 204 may house a processing system (not illustrated, but which may included the processor 102 discussed above with reference to FIG. 2) and a memory system (not illustrated, but which may include the memory 114 discussed above with reference to FIG. 2) that includes instructions that, when executed by the processing system, cause the processing system to provide a switch engine 206 that is configured to perform switch device functionality (e.g., including the functionality of the switch engine 206 or switch device 202 discussed below.) In specific examples, the switch engine 206 may be provided by a Network Processing Unit (NPU), a Central Processing Unit (CPU), and/or combinations thereof.

The chassis 204 may also house a communication system that is coupled to the switch engine 206 (e.g., via couplings between the communication system and the processing system). In the illustrated embodiment, the communication system includes controller/port combinations such as, for example, the controller 208a and the port 208b, the controller 210a and the port 210b, the controller 212a and the port 212b, the controller 214a and the port 214b, and up to the controller 216a and the port 216b illustrated in FIG. 2. In the examples discussed below, controller functionality is described for one or more of the controllers 208a, 210a, 212a, 214a, and 216a, and one of skill in the art in possession of the present disclosure will recognize that any of those controllers 208a-216a may include similar functionality. Furthermore, in some embodiments, the controllers 208a-216a may operate as part of a controller system that provides the controller functionality via operations of the controller and, in some situations, the switch engine 206 and/or other switch device components, while remaining within the scope of the present disclosure as well. While a specific switch device 202 has been illustrated and described, one of skill in the art in possession of the present disclosure will recognize that switch devices may include a variety of other components and/or component configurations for providing conventional switch device functionality, as well as the functionality discussed below, while remaining within the scope of the present disclosure as well.

In some embodiments, any of the controllers 208a-216a may be provided by, for example, a FALCON CORE® controller, available from available from BROADCOM® Inc. of San Jose, Calif. United States. However, other TDM SerDes controllers and/or other controllers that would be apparent to one of skill in the art in possession of the present disclosure will fall within the scope of the present disclosure as well. As will be recognized by one of skill in the art in possession of the present disclosure, conventional FALCON CORE® controllers (and other TDM SerDes controllers) utilized with 100G switch devices or other platforms may be configured to operate in a plurality of controller modes including a "100G mode" in which 100G communication speeds are enabled via 4 lanes to one port (e.g., 25G communication speeds on each lane), a "40G mode" in which 40G communication speeds are enabled via 4 lanes to one port (e.g., 10G communication speeds on each lane), a "2×50G mode" in which 50G communication speeds are enabled via 2 lanes to each of two ports (e.g., 25G communication speeds on each lane), a "4×25G mode" in which 25G communication speeds are enabled via 1 lane to each of four ports (e.g., 25 communication speeds on each lane), and a "4×10G mode" in which 10G communication speeds are enabled via 1 lane to each of four ports (e.g., 10G communication speeds on each lane.) However, one of skill in the art in possession of the present disclosure will recognize that future switch devices or other platforms may operate at higher speeds (e.g., 200G speeds, 400G speeds, etc.), and controllers in switch devices may be configured in other controller modes that will fall within the scope of the present disclosure as well.

In the example illustrated in FIG. 2, a pair of storage devices 218 and 220 are coupled to the port 208b on the switch device 202 via a transceiver 222. The storage device 218 includes port 218a and up to port 218b, and the storage device 220 includes port 220a and up to port 220b. In many of the examples discussed below, the transceiver 222 is an optical transceiver such as, for example, a Quad Small Form-factor Pluggable (QSFP) optical transceiver, although one of skill in the art in possession of the present disclosure will recognize that other types of optical transceivers, and/or other types of transceivers (e.g., copper transceivers, etc.), will fall within the scope of the present disclosure as well. As would be understood by one of skill in the art in possession of the present disclosure, transceivers may be configured to utilize a number of lanes, and operate at a speed of the ports on the connected device (e.g. the ports 218a-218b and 220a-220b on the storage devices 218 and 220, respectively.) In the examples provided below, the transceiver 222 may be configured to operate at 100G communication speeds utilizing four lanes for one port, 40G communication speeds utilizing four lanes for one port, 50G communication speeds utilizing two lanes for each of two ports, 25G communication speeds utilizing one lane for each of four ports, and 10G communication speeds utilizing one lane for each of four ports. However, one of skill in the art in possession of the present disclosure will recognize that transceivers may be configured to operate at different speeds and/or utilizing different numbers of lanes while remaining within the scope of the present disclosure. Furthermore, while the illustrated embodiment includes only a single pair of storage devices 218 and 220 coupled through a single transceiver 222 to the switch device 202, one of skill in the art in possession of the present disclosure will recognize that storage devices may (and typically will) be coupled to any or all of the ports on the switch device 202 while remaining within the scope of the present disclosure as well.

Furthermore, in the illustrated embodiment, a server device 224 is coupled to the port 214b on the switch device via a transceiver 226. The server device 224 includes port 224a, port 224b, port 224c, and up to port 224d. In many of the examples discussed below, the transceiver 224 is an optical transceiver such as, for example, a QSFP optical transceiver, although one of skill in the art in possession of the present disclosure will recognize that other types of optical transceiver, and/or other types of transceivers (e.g., copper transceivers, etc.), will fall within the scope of the present disclosure as well. As discussed above, transceivers may be configured to operate a particular speed utilizing a number of lanes. In the examples provided below, the transceiver 226 may be configured to operate at 100G communication speeds utilizing four lanes for one port, 40G communication speeds utilizing four lanes for one port, 50G communication speeds utilizing two lanes for each of two ports, 25G communication speeds utilizing one lane for each of four ports, and 10G communication speeds utilizing one lane for each of four ports. As would be understood by one of skill in the art in possession of the present disclosure, transceivers may be configured to utilize a number of lanes, and operate at a speed of the ports on the connected device (e.g. the ports 224a-224d on the server device 224.) Furthermore, while the illustrated embodiment includes only a single server device 224 coupled through a single transceiver 226 to the switch device 202, one of skill in the art in possession of the present disclosure will recognize that server devices may (and typically will) be coupled to any or all of the ports on the switch device 202 while remaining within the scope of the present disclosure as well. Further still, one of skill in the art in possession of the present disclosure will recognize that the combination of storage devices 218/220 and the server device 224 in FIG. 2 has been provided in order to discuss the functionality of the controllers 208a-216a in the switch device 202, and other embodiments may include any combination of storage devices, server devices, networking devices (e.g., switch devices, router devices, etc.), and/or any other device that is configured to utilize a transceiver while remaining within the scope of the present disclosure as well.

Figure 3:
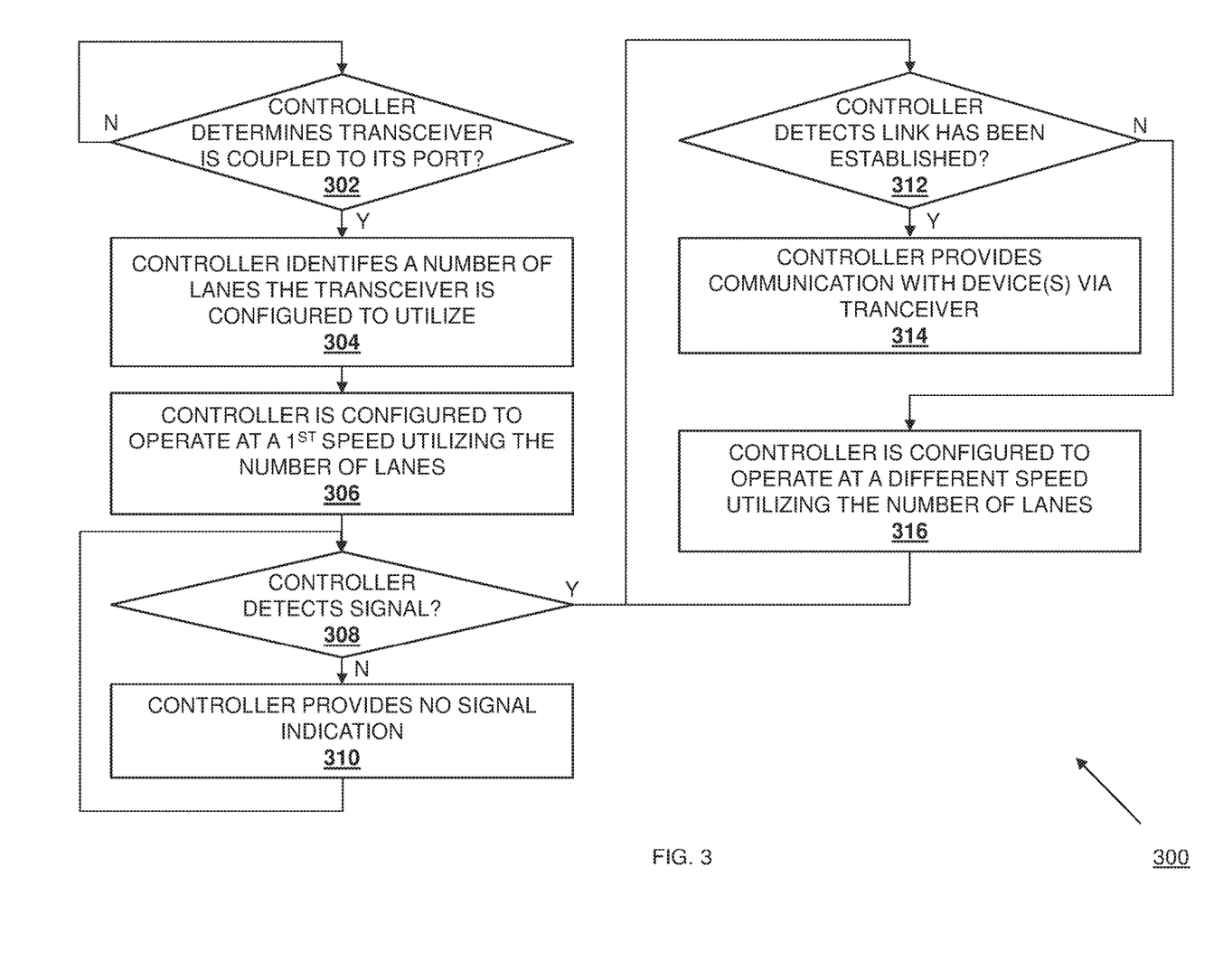
FIG. 3 is a flow chart illustrating an embodiment of a method for automatically configuring a controller.

Referring now to FIG. 3, an embodiment of a method 300 for automatically configuring a controller is illustrated. As discussed below, the systems and methods of the present disclosure provide for the automatic configuration of controllers coupled to ports based on the configuration of a transceiver connected to that port. As discussed above, conventional controllers in switch devices may be configurable in a variety of controller modes, and when the controller mode of conventional controller does not match the configuration of the transceiver that is connected to its port, a manual configuration of that conventional controller (e.g., changing the controller clock speed using a CLI after the transceiver is connected to the port) is required to establish a link even if the controller mode of the conventional controller and the configuration of the transceiver utilize the same number of lanes.

The systems and methods of the present disclosure provide for automatic controller configuration in situations where a transceiver is detected as connected to a port, and is identified as configured to utilize the same number of lanes as the controller for that port. As discussed below, in such situations, the controller may detect a signal from the transceiver, but determine that a link provided by the transceiver may not be established with the controller. A failure to establish a link with a controller may be due to a variety of factors, including the lack of a peer device (e.g., the storage devices 218/220 or the server device 224 of FIG. 2) connected to the transceiver; the peer device being connected to the transceiver but administratively "down" or otherwise unavailable; a defect, error, or other unavailability of the transceiver; a defect, error, or other unavailability of the cabling between the transceiver and the peer device; the use of a transceiver that is unsupported by the switch device and/or the peer device; improper port settings such as pre-emphasis settings, lane mapping settings, polarity settings or other port settings known in the art; a speed mismatch between controller and the transceiver/connected-device-ports; and/or other link failure issues that would be apparent to one of skill in the art in possession of the present disclosure. The inventors of the present disclosure have recognized that when a transceiver is configured to utilized the same number of lanes as the controller for the port to which it is connected (i.e., according to the current controller mode), the failure to establish a link provided by the transceiver and with the controller is likely due to the transceiver/connected-device-ports being configured to provide communications at a different speed than the current controller mode of the controller (i.e., the speed mismatch discussed above). As such, the systems and method of the present disclosure operate in such situations to automatically reconfigure the controller mode of the controller to cause the controller to operate at different speeds until a link provided by the transceiver is established with the controller, thus providing for automatic controller configuration and link establishment.

The method 300 begins at decision block 302 where a controller determines that a transceiver has been coupled to its port. In an embodiment, at decision block 302, a transceiver may be connected to any port on the switch device 202, and detected by the controller coupled to that port. For example, with reference to FIG. 2, the transceiver 222 (which is illustrated in FIG. 2 as coupled to the ports 218a and 218b on the storage device 218, and the ports 220a and 220b on the storage device 220) may be coupled to the port 208b, and at block 302 the controller 208a will detect that transceiver 222. Similarly, the transceiver 226 (which is illustrated in FIG. 2 as coupled to the ports 224a, 224b, 224c, and 224d on the server device 224) may be coupled to the port 214b, and at block 302 the controller 214b will detect that transceiver 226. If, at decision block 302, a controller determines that no transceiver has been coupled to its port, the method 300 loops back through decision block 302 such that the controller continues to monitor for a transceiver coupled to its port. As such, any controller in the switch device 202 may monitor for, and detect, transceivers coupled to their respective ports.

If, at decision block 302, the controller 302 determines that a transceiver has been coupled to its port, the method 300 then proceeds to block 304 where the controller identifies a number of lanes the transceiver is configured to utilize. In an embodiment, at block 304, any controller in the switch device 202 may identify a number of lanes that a connected transceiver is configured to utilize. For example, with reference to FIG. 2, the controller 208a may detect a number of lanes that the transceiver 222 is configured to utilized. As discussed above, either or both of the transceiver 222 the transceiver 226 may be configured to utilize four lanes (e.g., to provide 100G or 40G communication speeds on a single port), two lanes (e.g., to provide 50G communication speeds on each of two ports), or one lane (e.g., to provide 25G or 10G communication speeds on each of four ports). At block 304, the controller 208a may access an Electronically Erasable Programmable Read Only Memory (EEPROM) in the transceiver 222 to identify a transceiver type of the transceiver 222 (e.g., an optical transceiver type of the optical transceiver 222), the number of lanes the transceiver 222 is configured to utilize, and/or any other information about the transceiver 222 that would be apparent to one of skill in the art in possession of the present disclosure. Similarly, at block 304, the controller 214a may access an EEPROM in the transceiver 226 to identify a transceiver type of the transceiver 226 (e.g., an optical transceiver type of the optical transceiver 226), the number of lanes the transceiver 226 is configured to utilize, and/or any other information about the transceiver 226 that would be apparent to one of skill in the art in possession of the present disclosure.

The method 300 then proceeds to block 306 where the controller is configured to operate at a first speed utilizing the number of lanes. In an embodiment, at block 306, the controller may be configured to operate at a first speed utilizing the same number of lanes utilized by the transceiver (as identified at block 304.) In different embodiments, the configuration of the controller at block 306 may be performed by the controller itself, by the switch engine 206, by combinations of the controller and the switch engine 206, and/or utilizing any other component in the switch device 202 that would be apparent to one of skill in the art in possession of the present disclosure. In some embodiments, the first speed at which the controller is configured to operate may be a maximum speed for the controller, although speeds other than the maximum speed will fall within the scope of the present disclosure as well. As such, with reference to FIG. 2, at block 306 the controller 208a may be configured to operate at the first speed (e.g., the maximum speed of the controller 208a). Using the examples provided above, at block 306 the controller 208a may be configured to operate at 100G communication speeds utilizing 4 lanes for a single port (e.g., the "100G mode" discussed above), or may be configured to operate at 25G communication speeds utilizing 1 lane for each of four ports (e.g., the "4×25G mode" discussed above). Similarly, with reference to FIG. 2, at block 306 the controller 214a may be configured to operate at the first speed (e.g., the maximum speed of the controller 214a.) Using the examples provided above, at block 306 the controller 214a may be configured to operate at 100G communication speeds utilizing 4 lanes for a single port (e.g., the "100G mode" discussed above), or may be configured to operate at 25G communication speeds utilizing 1 lane for each of four ports (e.g., the "4×25G mode" discussed above).

The method 300 then proceeds to decision block 308 where the controller determines whether a signal has been detected. In an embodiment, at decision block 308, the controller may operate to determine whether a signal is detected from the transceiver. For example, with reference to FIG. 2, at decision block 308 the controller 208a may operate to determine whether a signal has been received from the transceiver 222. Similarly, with reference to FIG. 2, at decision block 308 the controller 214a may operate to determine whether a signal has been received from the transceiver 226.

In some embodiments, prior to or at decision block 308, the controller may also operate to determine that the controller mode of the controller is configured to cause the controller to utilize the same number of lanes utilized by the transceiver. For example, the controller 208a may determine that the number of lanes the transceiver 222 is configured to utilize is the same as the number of lanes utilized by the controller 208a according to its current controller mode. Similarly, the controller 214a may determine that the number of lanes the transceiver 226 is configured to utilize is the same as the number of lanes utilized by the controller 214a according to its current controller mode. In a specific example, the determination that the controller and the transceiver are each configured to utilize the same number of lanes may be accomplished by the controller detecting a signal from the transceiver at decision block 308 (i.e., the controller may only receive a signal from the transceiver if each is configured to utilize the same number of lanes.)

In some embodiments, at decision block 308 and upon detecting the signal from the transceiver, the system may operate to validate that signal. For example, the switch engine 206 (e.g., an NPU), any of the controllers (e.g., SerDes controllers), and/or combinations thereof may include registers that provide the ability to determine whether the signal detected from the transceiver is valid. In a specific example, the signal may be validated by checking a number of errors (e.g., bit errors) detected in the signal on the port associated with the controller that includes the registers, and if there are no errors then the signal may be validated. As would be understood by one of skill in the art in possession of the present disclosure, the signal may be validated at decision block 308 in order to ensure the transceiver is operational or otherwise available, to ensure that there are no bit errors that may be responsible for a failure to establish a link, and/or other validation reasons that would be apparent to one of skill in the art in possession of the present disclosure.

If, at decision block 308, the controller 302 determines that no signal has been detected, the method 300 then proceeds to block 310 where the controller may provide a no signal indication. In an embodiment, at block 310, any controller in the switch device 202 may be configured to provide a no signal indication (e.g., to the switch engine 206) in the event a transceiver is connected to its port and no signal is received from that transceiver. The method 300 then loops back through decision block 308 and block 310 such that the controllers in the switch device 202 continue to monitor for signals from connected transceivers. As such, at block 310, controllers may provide no signal indications if there is no peer device (e.g., the storage devices 218/220 or the server device 224 of FIG. 2) connected to the transceiver; a peer device is connected to the transceiver but is administratively "down" or otherwise unavailable; the transceiver has a defect or error, or is otherwise unavailable; the cabling between the transceiver and the peer device has a defect or error, or is otherwise unavailable; the transceiver is unsupported by the switch device and/or the peer device; the port settings (e.g., pre-emphasis settings, lane mapping settings, polarity settings) are improper; and/or for other no-signal issues that would be apparent to one of skill in the art in possession of the present disclosure.

If, at decision block 308, the controller 302 determines that a signal has been detected, the method 300 then proceeds to decision block 312 where the controller determines whether a link has been established. In an embodiment, at decision block 312, the controller determines whether a link provided via its connected transceiver has been established. For example, with reference to FIG. 2, at decision block 312 the controller 208a may determine whether a link provided via the transceiver 222 has been established. Similarly, with reference to FIG. 2, at decision block 312 the controller 214a may determine whether a link provided via the transceiver 226 has been established. In an embodiment, the switch engine 206, any of the controllers (e.g., SerDes controllers), and/or combination thereof may operate to expose an overall port link register to determine if the link status is "up" (i.e., the link is available) or "down" (i.e., the link is unavailable).

If, at decision block 312, the controller 302 determines that a link has been established, the method 300 proceeds to block 314 where the controller provides for communication with device(s) via the transceiver. As would be appreciated by one of skill in the art in possession of the present disclosure, if a link provided via the transceiver has been established with the controller, then the configuration of the controller to operate at the first speed at block 306 matched the speed at which the transceiver/connected-device-ports were configured to operate, which enables the controller to provide communications with devices coupled to the transceiver, As such, at block 314, the controller may provide for communications with devices coupled to the transceiver while operating at the first speed configured at block 306. For example, with reference to FIG. 2, at block 314 the controller 208a may provide for communications with the storage devices 218 and 220 coupled to the transceiver 222 while operating at the first speed (e.g., the maximum speed of the controller 208a.) As illustrated in FIG. 2, the configuration of the controller 208a at block 306 to operate at 25G communication speeds utilizing 1 lane for each of four ports (e.g., the "4×25G mode" discussed above) may match the configuration of the transceiver 222/ ports 218a, 218b, 220a, and 220b, and communications may then be provided by the controller 208a via the transceiver 222 with the storage devices 218 and 220. However, based on the other specific examples discussed above, the configuration of the controller 208a at block 306 to operate at 100G communication speeds utilizing 4 lanes for a single port (e.g., the "100G mode" discussed above) may match the configuration of the transceiver 222/ports 218a, 218b, 220a, and 220b, and communications may then be provided by the controller 208a via the transceiver 222 with the storage devices 218 and 220.

In another example, with reference to FIG. 2, at block 314 the controller 214a may provide for communications with the server device 224 coupled to the transceiver 226 while operating at the first speed (e.g., the maximum speed of the controller 214a.) As illustrated in FIG. 2, the configuration of the controller 214a at block 306 to operate at 25G communication speeds utilizing 1 lane for each of four ports (e.g., the "4×25G mode" discussed above) may match the configuration of the transceiver 226/ports 224a, 224b, 224c, and 224d, and communications may then be provided by the controller 214a via the transceiver 226 with the server device 224. However, based on the other specific examples discussed above, the configuration of the controller 214a at block 306 to operate at 100G communication speeds utilizing 4 lanes for a single port (e.g., the "100G mode" discussed above) may match the configuration of the transceiver 226/ports 224a, 224b, 224c, and 224d, and communications may then be provided by the controller 214a via the transceiver 226 with the server device 202.

If, at decision block 312, the controller 302 determines that no link has been established, the method 300 then proceeds to block 316 where the controller is configured to operate at a different speed utilizing the number of lanes. In some embodiments, at decision block 314 and prior to proceeding to block 316 when it has been determined that no link has been established, the controller may operate to disable error correction operations (e.g., Forward Error Correction (FEC) operations) for its port. As would be understood by one of skill in the art in possession of the present disclosure, error correction operations for a port may be disabled at decision block 316 in order to compensate for a configuration that does not provide support for those error correction operations (e.g., an administrator may disable FEC operations because 10G/40G communication speeds do not support FEC). As such, if the link is detected as established following the disabling of error correction operations, the method 300 may proceed to block 314 rather than block 316.

In an embodiment, at block 316, the controller may be configured to operate at a second speed that is different than the first speed, and utilizing the same number of lanes utilized by the transceiver (as identified at block 304.) In different embodiments, the configuration of the controller at block 316 may be performed by the controller itself, by the switch engine 206, by combinations of the controller and the switch engine 206, and/or utilizing any other component in the switch device 202 that would be apparent to one of skill in the art in possession of the present disclosure. In some embodiments, the second speed at which the controller is configured to operate may be less than the maximum speed for the controller, although other first speed/second speed combinations will fall within the scope of the present disclosure as well. As such, with reference to FIG. 2, at block 306 the controller 208a may be configured to operate at the second speed (e.g., less than the maximum speed of the controller 208a). Using the examples provided above, at block 306 the controller 208a may be configured to operate at 40G communication speeds utilizing 4 lanes for a single port (e.g., the "40G mode" discussed above), or may be configured to operate at 10G communication speeds utilizing 1 lane for each of four ports (e.g., the "4×10G mode" discussed above). Similarly, with reference to FIG. 2, at block 306 the controller 214a may be configured to operate at the second speed (e.g., less than the maximum speed of the controller 214a.) Using the examples provided above, at block 306 the controller 214a may be configured to operate at 40G communication speeds utilizing 4 lanes for a single port (e.g., the "40G mode" discussed above), or may be configured to operate at 10G communication speeds utilizing 1 lane for each of four ports (e.g., the "4×10G mode" discussed above).

The method then returns to decision block 312 where the controller determines whether the link has been established in substantially the same manner as discussed above, and may proceed to block 314 to provide communication with devices if that link has been established. As illustrated in FIG. 2, the configuration of the controller 208a at block 306 to operate at 10G communication speeds utilizing 1 lane for each of four ports (e.g., the "4×10G mode" discussed above) may match the configuration of the transceiver 222/ports 218a, 218b, 220a, and 220b, and communications may then be provided by the controller 208a via the transceiver 222 with the storage devices 218 and 220. However, with reference to the other specific examples discussed above, the configuration of the controller 208a at block 306 to operate at 40G communication speeds utilizing 4 lanes for a single port (e.g., the "40G mode" discussed above) may match the configuration of the transceiver 222/ports 218a, 218b, 220a, and 220b, and communications may then be provided by the controller 208a via the transceiver 222 with the storage devices 218 and 220.

Similarly, with reference to FIG. 2, the configuration of the controller 214a at block 306 to operate at 10G communication speeds utilizing 1 lane for each of four ports (e.g., the "4×10G mode" discussed above) may match the configuration of the transceiver 226/ports 224a, 224b, 224c, and 224d, and communications may then be provided by the controller 214a via the transceiver 226 with the server device 224. However, with reference to the other specific examples discussed above, the configuration of the controller 214a at block 306 to operate at 40G communication speeds utilizing 4 lanes for a single port (e.g., the "40G mode" discussed above) may match the configuration of the transceiver 226/ports 224a, 224b, 224c, and 224d, and communications may then be provided by the controller 214a via the transceiver 226 with the server device 202.

One of skill in the art will recognize that, as long as the link has not been established at decision block 312, the controller may be configured to operate at different speeds at block 316, and once the link has been established, the controller may operate to provide communication with devices via the transceiver at block 314. Thus, at a second iteration of block 316, the controller may be configured to operate at yet another different speed (e.g., a third speed that is different than the second speed and the first speed.) For example, in a 400G switch device or other platform, a controller may include controller modes that include a "4×100G mode" that provides 100G communication speeds utilizing one lane for each of four ports, a "4×50G mode" that provides 50G communication speeds utilizing one lane for each of four ports, and a "4×25G mode" that provides 25G communication speeds utilizing one lane for each of four ports, and thus the controller may be configured with three different communication modes to attempt to match the configuration of its connected transceiver/connected-device-ports.

In some embodiments, a transceiver connected to a controller/port combination may be connected to ports having different speeds. For example, with reference to the transceiver 226 connected to the port 214b on the switch device 202, as well as connected to the ports 224a, 224b, 224c, and 224d on the server device 224, the ports 224a, 224b, and 224c may be configured as 10G ports, while the port 224d may be configured as a 25G port. In another example, with reference to the transceiver 222 connected to the port 208b on the switch device 202, as well as connected to the ports 218a/218b on the storage device 218 and the ports 220a/220b on the storage device 220, the ports 218a/218b may be configured as 25G ports, while the ports 220a/220b may be configured as 10G ports. In such scenarios, the controllers may be configured in a controller mode that provides the highest number of ports with the same speed, with ties broken by selecting ports having the highest speed. As such, using the examples above, the controller 214a would be configured in the "4×10G mode", as there are three ports operating at 10G speeds, and only one port operating at 25G speeds (i.e., the "4×10G mode" for the controller will provide link establishment and communications over three of the four ports). Similarly, using the examples above, the controller 208a would be configured in the "4×25G mode", as there are two ports operating at 10G speeds and two ports operating at 25G speeds, with the higher 25G speeds being the tiebreaker (i.e., the "4×25G mode" for the controller provides link establishment and communications over two of the four ports with the highest speeds).

Thus, systems and methods have been described that provide for automatic controller configuration in situations where a transceiver is detected as connected to a port, and is identified as configured to utilize the same number of lanes as the controller for that port. When a transceiver is connected to a port, the controller for that port is configured to operate at a maximum speed. If the controller detects a signal from the transceiver, then the controller and the transceiver are each configured to utilize the same number of lanes. If a link provided via the transceiver is also established with the controller, the controller may then provide for communications with devices coupled to that transceiver. However, if a link provided via the transceiver is not established with the controller, the controller is then automatically reconfigured to operate at different speed(s) until a link provided via the transceiver is established with the controller, thus providing for automatic controller configuration and link establishment so that the controller may then automatically provide communications with devices coupled to that transceiver.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automatic controller configuration system, comprising:
 a chassis;
 a port that is located on the chassis;
 a transceiver that is connected to the port and that is configured to utilize a number of lanes; and
 a controller that is located in the chassis and that is coupled to the port, wherein the controller is configured to:
  identify the number of lanes that the transceiver is configured to utilize;
  configure a controller mode of the controller to cause the controller to operate at a first controller speed utilizing the number of lanes;
  reconfigure, in response to detecting a signal transmitted by the transceiver and determining that a link provided via the transceiver has not been established with the controller operating at the first controller speed utilizing the number of lanes, the controller mode to cause the controller to operate at a second controller speed utilizing the number of lanes; and
  provide, in response to detecting the signal transmitted by the transceiver and determining that the link provided via the transceiver has been established with the controller operating at the second controller speed utilizing the number of lanes, communications with at least one device via the transceiver and at the second controller speed utilizing the number of lanes.

2. The system of claim 1, wherein the controller is configured to:
 determine, in response to detecting the signal transmitted by the transceiver, that the controller mode is configured to cause the controller to utilize the number of lanes utilized by the transceiver.

3. The system of claim 1, wherein the first controller speed is a maximum controller speed, and wherein the second controller speed is less than the maximum controller speed.

4. The system of claim 1, wherein the controller is configured to:
operate, in response to detecting the signal transmitted by the transceiver and determining that the link provided via the transceiver has been established with the controller operating at the first controller speed utilizing the number of lanes, the controller at the first controller speed utilizing the number of lanes.

5. The system of claim 1, wherein the controller is configured to:
validate, in response to detecting the signal transmitted by the transceiver, the signal.

6. The system of claim 1, wherein the controller is configured to:
disable, in response to detecting the signal transmitted by the transceiver and determining that a link provided via the transceiver has not been established with the controller system operating at the first speed utilizing the number of lanes, error correction operations for the port.

7. An Information Handling System (IHS), comprising:
a port; and
a controller system that is coupled to the port, wherein the controller system is configured to:
identify, when a transceiver is connected to the port, a number of lanes that the transceiver is configured to utilize;
configure the controller system to operate at a first speed utilizing the number of lanes;
reconfigure, in response to detecting a signal transmitted by the transceiver and determining that a link provided via the transceiver has not been established with the controller system operating at the first speed utilizing the number of lanes, the controller system to operate at a second speed utilizing the number of lanes; and
provide, in response to detecting the signal transmitted by the transceiver and determining that the link provided via the transceiver has been established with the controller system operating at the second speed utilizing the number of lanes, communication with at least one device via the transceiver and at the second speed utilizing the number of lanes.

8. The IHS of claim 7, wherein the controller system is configured to:
determine, in response to detecting the signal transmitted by the transceiver, that the controller system is configured to utilize the number of lanes utilized by the transceiver.

9. The IHS of claim 7, wherein the first speed is a maximum speed for the controller system, and wherein the second speed is less than the maximum speed for the controller system.

10. The IHS of claim 7, wherein the controller system is configured to:
operate, in response to detecting the signal transmitted by the transceiver and determining that the link provided via the transceiver has been established with the controller system operating at the first speed utilizing the number of lanes, the controller system at the first speed utilizing the number of lanes.

11. The IHS of claim 7, wherein the controller system is configured to:
validate, in response to detecting the signal transmitted by the transceiver, the signal.

12. The IHS of claim 7, wherein the controller system is configured to:
disable, in response to detecting the signal transmitted by the transceiver and determining that the link provided via the transceiver has not been established with the controller system operating at the first speed utilizing the number of lanes, error correction operations for the port.

13. The IHS of claim 7, wherein the controller system is configured to:
reconfigure, in response to detecting the signal transmitted by the transceiver and determining that the link provided via the transceiver has not been established with the controller system operating at the second speed utilizing the number of lanes, the controller system to operate at a third speed utilizing the number of lanes; and
provide, in response to detecting the signal transmitted by the transceiver and determining that the link provided via the transceiver has been established with the controller system operating at the third speed utilizing the number of lanes, communications with at least one device via the transceiver and at the third speed utilizing the number of lanes.

14. A method for automatically configuring a controller, comprising:
identifying, by a controller when a transceiver is connected to a port that is coupled to the controller, a number of lanes that the transceiver is configured to utilize;
configuring, by the controller, the controller to operate at a first speed utilizing the number of lanes;
reconfiguring, by the controller, in response to detecting a signal transmitted by the transceiver and determining that a link provided via the transceiver has not been established with the controller operating at the first speed utilizing the number of lanes, the controller to operate at a second speed utilizing the number of lanes; and
providing, by the controller in response to detecting the signal transmitted by the transceiver and determining that the link provided via the transceiver has been established with the controller operating at the second speed utilizing the number of lanes, communication with at least one device via the transceiver and at the second speed utilizing the number of lanes.

15. The method of claim 14, further comprising:
determining, in response to detecting the signal transmitted by the transceiver, that the controller is configured to utilize the number of lanes utilized by the transceiver.

16. The method of claim 14, wherein the first speed is a maximum speed for the controller, and wherein the second speed is less than the maximum speed for the controller.

17. The method of claim 14, further comprising:
operating, by the controller in response to detecting the signal transmitted by the transceiver and determining that the link provided via the transceiver has been established with the controller operating at the first speed utilizing the number of lanes, the controller at the first speed utilizing the number of lanes.

18. The method of claim 14, further comprising:
validating, by the controller in response to detecting the signal transmitted by the transceiver and determining that the link provided via the transceiver has not been established with the controller operating at the first speed utilizing the number of lanes, the signal.

19. The method of claim 14, further comprising:
disabling, in response to detecting the signal transmitted by the transceiver and determining that the link provided via the transceiver has not been established with the controller operating at the first speed utilizing the number of lanes, error correction operations for the port.

20. The method of claim 14, further comprising:
reconfiguring, by the controller in response to detecting the signal transmitted by the transceiver and determining that the link provided via the transceiver has not been established with the controller operating at the second speed utilizing the number of lanes, the controller to operate at a third speed utilizing the number of lanes; and
providing, by the controller in response to detecting the signal transmitted by the transceiver and determining that the link provided via the transceiver has been established with the controller operating at the third speed utilizing the number of lanes, communication with at least one device via the transceiver and at the third speed utilizing the number of lanes.

\* \* \* \* \*